2,891,966

ALKYLATION OF PHENOLS, THIOPHENES, AND FURANS

Jerome A. Vesely, Park Ridge, and Carl B. Linn, Riverside, Ill., assignors to Universal Oil Products Company, Chicago, Ill., a corporation of Delaware No Drawing. Application April 27, 1955
Serial No. 504,373

12 Claims. (Cl. 260—329)

This invention relates to a process for the alkylation of aromatic compounds in the presence of a novel catalyst. More particularly, this invention relates to the alkylation of an alkylatable aromatic compound selected from the group consisting of a phenol, a thiophene, and a furan with an olefin-acting compound at alkylating conditions in the presence of an alkylation catalyst comprising a complex of boron trifluoride and an iron group metal fluoride.

An object of this invention is to produce alkylated aromatic compounds and particularly to produce alkylated phenols. A specific object of this invention is the production of phenols having alkyl substituents, useful per se or as intermediates in the production of plastics, pharmaceuticals, and other organic compounds. Thus, a specific object of this invention is the production of 2,6-di-tert-butyl-4-methylphenol by the alkylation of p-cresol with tert-butyl chloride or isobutylene. 2,6-di-tert-butyl-4-methylphenol is a very effective antioxidant for preventing the oxidative deterioration of organic substances susceptible to such deterioration. For example, 2,6-di-tert-butyl-4-methylphenol is presently utilized as an antioxidant for aviation gasoline to prevent deterioration of said gasoline and of the tetraethyl lead contained therein. Other objects of this invention will be set forth hereinafter as part of the specifications and in the accompanying examples.

Numerous catalysts have been proposed for the alkylation of aromatic compounds with olefin-acting compounds including liquid catalysts such as sulfuric acid, phosphoric acid, fluosulfonic acid, chlorosulfonic acid, hydrogen fluoride, etc. Similarly, solid catalysts such as aluminum chloride, aluminum bromide, metal oxides, metal sulfides, clays, etc., have been proposed. Each of the prior art catalysts has suffered from at least one inherent disadvantage and it is a further object of this invention to provide an alkylation catalyst which overcomes each and all such disadvantages. For example, the prior art teaches that liquid hydrogen fluoride is not a satisfactory catalyst for the ethylation of p-methoxyphenol with ethylene or ethyl chloride. In addition, sulfuric acid has the inherent disadvantage that rapid deterioration of the catalyst takes place during use.

Aluminum chloride is at least partially soluble in aromatic compounds under the conditions used for alkylation and thus cannot be readily utilized in a fixed bed operation even though the aluminum chloride may have been impregnated prior to use on an inert support. Aluminum bromide as is well known, will be much more soluble in aromatic compounds than is aluminum chloride. Further, extensive sludge formation, an undesirable side reaction, occurs when aluminum chloride is used for the alkylation of aromatic compounds. Metal oxides, clays, solid phosphoric acid, etc., which are stable solid catalysts can only be utilized at high temperatures and high pressures or both. Use of the novel catalyst composition of the present invention overcomes these and other disadvantages which are well known to one skilled in the art.

In one embodiment the present invention relates to the alkylation of an alkylatable aromatic compound selected from the group consisting of a phenol, a thiophene, and a furan with an olefin-acting compound at alkylating conditions in the presence of a catalyst comprising a complex of boron trihalide and an iron group metal halide.

Another embodiment of the present invention relates to the alkylation of an alkylatable phenol with an olefin-acting compound at alkylating conditions in the presence of a catalyst comprising a complex of boron trifluoride and an iron group metal fluoride.

A further embodiment of the present invention relates to the alkylation of a thiophene with an olefin-acting compound at alkylating conditions in the presence of a catalyst comprising a complex of boron trifluoride and an iron group metal fluoride.

A still further embodiment of the present invention relates to the alkylation of a furan with an olefin-acting compound at alkylating conditions in the presence of a catalyst comprising a complex of boron trifluoride and an iron group metal fluoride.

An additional embodiment of this invention relates to the alkylation of an alkylatable monohydric phenol with an olefin-acting compound at alkylating conditions in the presence of a catalyst comprising a complex of boron trifluoride and an iron group metal fluoride.

A specific embodiment of this invention relates to the alkylation of phenol with ethylene at alkylating conditions in the presence of a catalyst comprising a complex of boron trifluoride and ferrous fluoride.

Another specific embodiment of the present invention relates to the alkylation of p-cresol with isobutylene at alkylating conditions in the presence of a catalyst comprising a complex of boron trifluoride and ferrous fluoride.

A still further embodiment of the present invention relates to the alkylation of thiophene with isoprene at alkylating conditions in the presence of a catalyst comprising a complex of boron trifluoride and ferrous fluoride.

An additional specific embodiment of this invention relates to the alkylation of furan with tert-butyl alcohol at alkylating conditions in the presence of a catalyst comprising boron trifluoride and ferrous fluoride.

Other embodiments of the present invention will become apparent in considering the specifications as hereinafter set forth.

We have found that a complex of boron trifluoride and an iron group metal fluoride is a catalyst composition useful in the alkylation of aromatic compounds reaction where the aromatic compounds are selected from the group consisting of a phenol, a thiophene, and a furan. As will be illustrated in the examples appended to the present specification, the catalyst of the present invention gives results different than are obtained by the use of boron trifluoride alone. For example, the products formed in the alkylation of m-cresol with mixed amylenes are different than those obtained in the presence of boron trifluoride alone wherein large amounts of phenol ethers are encountered. These same differences may also prevail in comparison with catalysts comprising mixtures of hydrogen fluoride and boron trifluoride. As hereinbefore set forth, the novel catalyst for the alkylation of aromatic compounds selected from the group consisting of a phenol, a thiophene, and a furan is a complex of boron trifluoride and an iron group metal fluoride. The metal fluoride preferably comprises iron fluoride. Other iron group metal fluorides included within the scope of the present invention are cobalt fluoride and nickel fluoride but not necessarily with equivalent results. In general, the metals in the metal fluorides which are in the low valence state appear to be more effective and are preferred. This includes particularly ferrous fluoride. Similarly, cobaltous fluoride and nickelous fluoride are more effective than corresponding salts in higher valence states. Other complexes of boron trifluoride and metal fluorides with such metals as chromium, molybdenum, tungsten, vanadium, manganese, zirconium, etc., can be prepared and utilized but not necessarily with equivalent results to the preferred iron group metal fluorides.

The preferred catalyst composition for the alkylation of aromatic compounds selected from the group consisting of a phenol, a thiophene, and a furan reaction comprises a complex of boron trifluoride and ferrous fluoride. This complex analyzes as $FeF_5B$ and is believed to be of the formula $FeF_2BF_3$. However, this novel catalyst complex may also contain two or possibly more $BF_3$ constituents complexed with ferrous fluoride. Also, it is possible that one $BF_3$ constituent may be complexed with two or more metal fluoride components thus effecting the necessary association of these components in order to produce the desired catalytic properties for the alkylation of aromatic compounds selected from the group consisting of a phenol, a thiophene, and a furan reaction. From a consideration of the theoretical formula hereinbefore set forth, and from consideration of the method in which the complex is prepared, as well as the stability of boron trifluoride, it is believed that the boron trifluoride constituent is present as such in the complex and does not become dissociated.

The complex of boron trifluoride and ferrous fluoride is a nonfuming white solid and is stable at ordinary temperature and pressure. However, it loses boron trifluoride when heated, gradually at first, and substantially at 50° C. at atmospheric pressure. Therefore, the complex should not be heated to high temperature at atmospheric pressure. However, when it is desired to heat the complex and to conduct the alkylation of aromatic compounds selected from the group consisting of a phenol, a thiophene, and a furan reaction at elevated temperatures, the heating and reaction should be effected under sufficient pressure to preclude the loss of boron trifluoride. The complex may be formed in any suitable manner. In one method, hydrogen fluoride is reacted with iron to form ferrous fluoride and the latter is then reacted with boron trifluoride to form the complex. In another method, hydrogen fluoride and boron trifluoride are contacted simultaneously with iron. In preparing the complex, it apparently is necessary that an environment of hydrogen fluoride be present during the addition of the boron trifluoride. Therefore, when the hydrogen fluoride is added first, and then the boron trifluoride, sufficient hydrogen fluoride should be present in the system in order to effect the formation of the desired complex. The iron preferably is in the finely divided state and comprises iron powder. The reaction is exothermic and yields one mol of hydrogen for each gram atom of iron. It will be noted that the preferred reaction entails two mols of hydrogen fluoride and one mol each of iron and boron trifluoride.

The complex as formed in the above manner is utilized as a solid catalyst for the alkylation of aromatic compounds selected from the group consisting of a phenol, a thiophene, and a furan reaction. In being utilized as a solid mass, the complex in lump form or as preformed pills may be disposed as a fixed bed in a reaction zone.

Another feature of the present invention is that the complex may be utilized as a solid mass or as a composite with a suitable supporting material. The supporting material preferably is porous. A particularly preferred supporting material for the complex comprises a carbonaceous support such as activated charcoal. Other carbonaceous supports such as petroleum coke, coconut char, bone char, etc., may also be utilized. Other supporting materials may comprise certain metal fluorides, for example, aluminum fluoride, calcium fluoride, magnesium fluoride, strontium fluoride, barium fluoride, etc. A composite of complex and support may be prepared in any suitable manner.

It is understood that the support for the complex may comprise other metal fluorides. Similarly, the other halides including chlorine, bromide, and/or iodide, of the metals specifically set forth hereinabove, may be utilized provided they meet the requirements hereinafter set forth. Furthermore, metal oxides and other metal compounds may be employed provided they will retain satisfactory physical properties during use. In some cases, the metal oxide or other metal compound may in part react with the metal halide but will retain its physical properties to provide a suitable supporting material. It is understood that the various supports are not necessarily equivalent and that the particular supports to be utilized will be selected with regard to the specific complex utilized as the catalyst.

While the specific instructions hereinabove set forth are directed to the preparation of the catalyst complex of iron fluoride and boron trifluoride, it is understood that the complex of cobalt fluoride with boron trifluoride and the complex of nickel fluoride with boron trifluoride may be employed but not necessarily with equivalent results. The complex containing cobalt and the complex containing nickel may be prepared in substantially the same manner as described in connection with the preparation of the complex containing iron. Similarly, while the preferred complex of the present invention contains fluorine as the halogen, it is understood that in certain cases, the complex may contain one or more of the other halogens, namely, chlorine, bromine, and iodine, but not necessarily with equivalent results. Furthermore, it is understood that suitable modifications will be made when necessary in preparing these other complexes. In some cases, the complex may contain two or more metals, particularly of the iron group, and two or more halogens.

As hereinabove set forth, the present invention relates to a process for the alkylation of an alkylatable aromatic compound selected from the group consisting of a phenol, a thiophene, and a furan with an olefin-acting compound at alkylating conditions in the presecne of a catalyst comprising a complex of boron trifluoride and an iron group metal fluoride. Many phenolic compounds are utilizable as starting materials. Preferred phenolic compounds are monohydric phenols, and particularly monocyclic monohydric phenols. Suitable phenols include phenol itself, o-cresol, m-cresol, p-cresol, o-chlorophenol, m-chlorophenol, p-chlorophenol, p-bromophenol, o-ethylphenol, 2,4-dichlrophenol, 2,6-dichlorophenol, 2,4-dinitrophenol, p-nitrophenol, alpha-naphthol, beta-naphthol, guiacol, anol, eugenol, isoeugenol, saligenin, carvacrol, thymol, o-hydroxyacetophenone, o-hydroxydiphenyl, p-hydroxydiphenyl, p-methoxyphenol, p-ethoxyphenol, o-cyclohexylphenol, p-cyclohexylphenol, catechol, resorcinol, hydroquinone, pyrogallol, hydroxyhydroquinone, phloroglucinol, o-aminophenol, m-aminophenol p-aminophenol, etc.

In addition to the phenols hereinabove set forth, a thiophene or a furan are also suitable starting materials in the process of the present invention. Thiophenes and furans are heterocyclic aromatic compounds containing a stable ring or nucleus such as is present in benzene, and which possess unsaturation in the sense that benzene does. Consequently, it can be seen that the term aromatic compound includes not only carbocylic compounds but also heterocyclic compounds having a stable nucleus. Suitable thiophene compounds utilizable as starting materials in the process of the present invention includes thiophene itself, 2-methylthiophene, 3-methylthiophene, 2,3-dimethylthiophene, 3,4-dimethylthiophene, 2-ethylthiophene, 2-propylthiophene, 2-butylthiophene, and other alkylthiophenes, 2-chlorothiophene, 3-chlorothiophene, 2,3-dichlorothiophene, 3,4-dichlorothiophene, and other halothiophenes, 2-nitrothiophene, 3-nitrothiophene, etc., 2-cyanothiophene, 3-cyanothiophene, 2-carboxythiophene, 3-carboxythiophene, etc. Furans which are suitable as starting materials in the process of the present invention include furan itself, 2-methylfuran, 3-methylfuran, 2,3-dimethylfuran, 3,4-dimethylfuran, 2-ethylfuran, 2-propylfuran, 2-butylfuran, and other alkyl furans, 2- chlorofuran, 3-chlorofuran, 2,3-dichlorofuran, 3,4-dichlorofuran, and other halofurans, 2-nitrofuran, 3-nitrofuran, 2-cyanofuran, 3-cyanofuran, 2-carboxyfuran, 3-carboxyfuran, etc.

Suitable alkylating agents which may be charged in this process are olefin-acting compounds including monoolefins, diolefins, polyolefins, also alcohols, ethers, esters, the latter including alkyl halides, alkyl phosphates, certain alkyl sulfates, and also esters of various organocarboxylic acids. The preferred olefin-acting compounds are olefinic hydrocarbons having one double bond per molecule and polyolefins which have more than one double bond per molecule. Monoolefins which may be utilized for alkylating the alkylatable aromatic compounds of the present invention in the presence of a catalyst comprising a complex of boron trifluoride and an iron group metal fluoride are either normally gaseous or normally liquid and include ethylene, propylene, 1-butene, 2-butene, isobutylene, pentenes, and higher normally liquid olefins, the latter including various olefin polymers having from 6 to 18 carbon atoms per molecule. Cycloolefins such as cyclopentene, cyclohexene, and various alykylcycloolefins, such as methylcyclopentene, methylcyclohexene, etc., may also be utilized but generally not under the exact same conditions applying to the acyclic olefins. The polyolefinic hydrocarbons utilizable in the process of the present invention incude conjugated diolefins, such as butadiene and isoprene, as well as nonconjugated diolefins and other polyolefinic hydrocarbons containing more than two double bonds per molecule.

Alkylation of the above alkylatable aromatic compounds may also be effected in the presence of the hereinabove referred to catalyst by reacting said aromatic compounds with certain substances capable of producing olefinic hydrocarbons under the conditions of operation chosen for the process. Such olefin-acting substances include alkyl halides capable of undergoing dehydrohalogenation to form olefinic hydrocarbons containing at least two carbon atoms per molecule. The alkyl halides comprises the particularly desirable group of compounds which act as olefins in admixture with alkylatable aromatic compounds in the presence of a catalyst of the present type. In each case, the olefinic hydrocarbon and the above-mentioned olefin-producing substances are herein referred to as olefin-acting compounds.

In accordance with the process of the present invention, the alkylation of aromatic compounds selected from the group consisting of a phenol, a thiophene, and a furan reaction to produce aromatic compounds of higher molecular weight than the compounds charged to the process is effected in the presence of the above-indicated catalyst at a temperature of from about −60° or lower to about 300° C. or higher, and preferably from about 0° C. to about 200° C., although the exact temperature needed for a particular aromatic compound alkylation reaction will depend upon the specific reactants employed.

The alkylation reaction is generally carried out at a pressure of from about substantially atmospheric to about 100 atmospheres, and preferably under sufficient pressure to maintain the reactants and the products in substantially liquid phase and to maintain the complex as such so that boron trifluoride is not lost therefrom. Referring to the aromatic compound subjected to the alkylation, it is preferable to have present from 2 to 10 or more, sometimes up to 20 molecular proportions of alkylatable aromatic compound per one molecular proportion of olefin-acting compound introduced thereto, particularly olefin hydrocarbon. The higher molecular ratios of alkylatable aromatic compound to olefin are especially desirable when the olefin employed in the alkylation is a higher molecular weight olefin boiling generally higher than pentenes, since these olefins frequently undergo depolymerization prior to or substantially simultaneously with alkylation so that one molecular proportion of such an olefin can thus alkylate two or more molecular proportions of the alkylatable aromatic compound. The higher molecular ratios of alkylatable aromatic compound to olefin also tends to reduce the formation of polyalkylated products because of the operation of the law of mass action under these conditions. In some cases it may be desirable to maintain or employ an atmosphere of hydrogen within the reaction zone.

In converting the aromatic compounds as set forth hereinabove to effect alkylation thereof with the type of catalysts hereindescribed, either batch or continuous operations may be employed. The actual operation of the process admits of some modification depending upon the normal phase of the reacting constituents, and whether batch or continuous operations are employed. In a sample type of batch operation the aromatic compound to be alkylated, such as, for example, phenol, is brought to a temperature and pressure within the approximate range specified in the presence of a catalyst comprising a complex of boron trifluoride and an iron group metal fluoride having a concentration corresponding to a sufficiently high activity and its alkylation is effected by the gradual introduction under pressure of an olefin such as, for example, isobutylene, in a manner to attain contact between catalyst and reactant compounds.

In another method of operation, the aromatic compound may be mixed with an olefin at a suitable temperature, a catalyst comprising a complex of boron trifluoride and an iron group metal fluoride such as ferrous fluoride, is added thereto and the reaction of alkylation induced by a sufficiently long contact time with the catalyst. Alkylation may be allowed to progress to different stages depending upon contact time. In the case of alkylation of a phenol with normally gaseous olefins, the best products are produced by the condensation of equimolecular quantities of phenols and olefins. After a batch treatment, the organic fraction or layer is removed by decantation in some instances, and is subjected to fractionation for recovery of the desired reaction products.

In one type of continuous operation, a liquid phenol such as meta cresol, may be pumped through a reactor containing the solid complex per se or impregnated on a suitable support. The olefin-acting compound may be added to the phenolic compound stream just prior to contact of this stream with the solid catalyst bed, or it may be introduced in multistages at various points in the catalyst bed. The details of continuous processes of this general character are familiar to those skilled in the alkylation of aromatic compounds art and any necessary additions or modifications of the above general procedures will be more or less obvious and can be made without departing from the generally broad scope of the invention.

The process of the present invention is illustrated by the following examples which are introduced for the purpose of illustration and with no intention of unduly limiting the generally broad scope of the present invention.

*Example I*

A complex was prepared by the general method of placing 28 grams of iron powder and 88 grams of anhydrous hydrogen fluoride in a copper lined steel autoclave. The autoclave was heated to about 100° C., and rotated for about one-half hour, following which it was allowed to cool and the hydrogen formed during the reaction was released. 61 grams of boron trifluoride was then pressured into the autoclave followed by rotating the autoclave for 20 hours at 23° C. 82 grams of complex were recovered as a white solid. The analysis of the complex is as follows: calculated for $FeF_2BF_3$: 34.6% iron, 58.7% fluorine, and 7.6% boron. The complex analyzed 34.5% iron, 45.9% fluorine, and 7.6% boron. It will be noted that there is some discrepancy in the fluorine determination but this is due to difficulties in the analysis of fluorine in the presence of boron.

8 grams of the complex prepared in substantially the same manner as described hereinabove was added to a 250 ml. glass alkylation flask along with 27 grams (0.25 mol) of m-cresol. The glass alkylation flask was fitted with a mechanical stirrer, thermometer, Dry-Ice reflux condenser, and a dropping funnel. 17.5 grams (0.25 mol) of mixed amylenes were then added with the alkylation flask over a period of 65 minutes. Temperature increase was noted during the olefin addition. The reaction temperature was maintained at 27–30° by cooling the reactor in a cold water bath and adjusting the rate of olefin addition. Stirring was continued for an additional 55 minutes and the reaction temperature maintained at 27–30° C. as it had been during the olefin addition.

The organic reaction product, 41.3 grams, was transferred to a distillation flask and distilled at atmospheric pressure. The distillation data are given in the following table:

| Fraction | Boiling Point, ° C. | Grams | $n_D^{20}$ |
|---|---|---|---|
| 1 | 211–241 | 4.7 | 1.5230 |
| 2 | 241–247 | 12.8 | 1.5192 |
| 3 | 247–249 | 12.7 | 1.5186 |
| 4 | 249–255 | 3.3 | 1.5170 |
| 5 | 255–284 | 2.8 | 1.5135 |
| Bottoms | | 3.0 | 1.5297 |
| Column Holdup | | 0.7 | 1.5140 |
| Dry Ice Trap | | 2.3 | 1.3828 |

The first fraction gave a positive test with 1% ferric chloride solution indicating the presence of unreacted m-cresol in contrast to the other cuts which gave no such reaction. When this cut was treated with 20% sodium hydroxide, approximately 2.2 grams were found to be soluble, further substantiating the presence of unreacted m-cresol. The remaining fractions in addition to giving no positive test with ferric chloride solution for unreacted m-cresol were completely insoluble in 20% sodium hydroxide but almost completely soluble in Claisen's solution, a 1:1:2 mixture of potassium hydroxide, water, and methanol. Fractions 2–5 are within the boiling range of amyl cresols, the wide boiling range being due to the isomeric mixture of amylenes charged.

Fractions 2 and 5 were found by infrared analysis to be characteristic of 1,2,4-trisubstituted benzene types. The band intensity of the hydroxyl group indicated the order of one hydroxyl group per molecule. Evidence favors a structural formula which is in agreement with the solubility characteristics, that is, 2-amyl-5-methylphenol. There was no evidence of ether formation, a major reaction when $BF_3$ alone is used as the reaction catalyst.

*Example II*

This example illustrates the reaction of thiophene with 2-pentene in the presence of the novel catalyst composition of the present invention. This experiment was carried out in substantially the same manner as described in Example I, hereinabove. In this experiment, 84 grams of thiophene (1 mol) and 17 grams of complex prepared in substantially the same manner as described in Example I were added to a glass alkylating flask. 18 grams of 2-pentene was added over a ten minute period. During this time the temperature of the reactants was maintained at about 30° C. Stirring was continued for an additional hour and fifteen minutes during which time the temperature was gradually raised to 60° C. At the end of two hours, the reaction mixture was cooled, filtered, washed with water, washed with potassium carbonate solution, dried, and then distilled. 3.7 grams of amylthiophenes were found in the distillate. These amylthiophenes boiled from 188–200° C. and had a refractive index, $n_D^{20}$, of 1.4960–1.4990. This refractive index is in contrast to the refractive index of thiophene, that is, $n_D^{20}$, 1.5287.

A duplicate experiment was carried out in which the amount of 2-pentene was doubled and in which the amount of catalyst was halved. Here again, 3.7 grams of amylthiophene was separated from the distillate, its boiling range and refractive index being the same as that described hereinabove.

*Example III*

In a manner similar to that described in Example II, one mol of furan is reacted with one-half mol of tert-butyl alcohol in a glass alkylating flask in the presence of 17 grams of complex prepared in substantially the same manner as described in Example I. Reaction temperature is maintained at 20° C. for two hours time after which the reaction product is distilled. Tert-butyl furan is separated from the reaction product.

We claim as our invention:

1. A process which comprises alkylating the nucleus of an alkylatable aromatic compound selected from the group consisting of a phenol, a thiophene, and a furan in the presence of a preformed complex of equimolar proportions of boron trifluoride and ferrous fluoride.

2. The process of claim 1 further characterized in that said aromatic compound is alkylated with an olefin.

3. A process which comprises alkylating the nucleus of an alkylatable phenol with an olefin in the presence of a preformed complex of equimolar proportions of boron trifluoride and ferrous fluoride.

4. A process which comprises alkylating the nucleus of an alkylatable thiophene with an olefin in the presence of a preformed complex of equimolar proportions of boron trifluoride and ferrous fluoride.

5. A process which comprises alkylating the nucleus of an alkylatable furan with an olefin in the presence of a preformed complex of equimolar proportions of boron trifluoride and ferrous fluoride.

6. A process which comprises alkylating the nucleus of an alkylatable monohydric phenol with an olefin in the presence of a preformed complex of equimolar proportions of boron trifluoride and ferrous fluoride.

7. A process which comprises alkylating the nucleus of m-cresol with a monoolefinic hydrocarbon in the presence of a preformed complex of equimolar proportions of boron trifluoride and ferrous fluoride.

8. A process which comprises alkylating the nucleus of a thiophene with a monoolefinic hydrocarbon in the presence of a preformed complex of equimolar proportions of boron trifluoride and ferrous fluoride.

9. A process which comprises alkylating the nucleus of furan with a tert-alkyl alcohol in the presence of a preformed complex of equimolar proportions of boron trifluoride and ferrous fluoride.

10. A process which comprises alkylating the nucleus of m-cresol with an amylene in the presence of a preformed complex of equimolar proportions of boron trifluoride and ferrous fluoride.

11. A process which comprises alkylating the nucleus of thiophene with 2-pentene in the presence of a preformed complex of equimolar proportions of boron trifluoride and ferrous fluoride.

12. A process which comprises alkylating the nucleus of furan with tert-butyl alcohol in the presence of a preformed complex of equimolar proportions of boron trifluoride and ferrous fluoride.

References Cited in the file of this patent

UNITED STATES PATENTS

| | | |
|---|---|---|
| 2,092,295 | Van Peski | Sept. 7, 1937 |
| 2,435,087 | Luten | Jan. 27, 1948 |
| 2,469,823 | Hansford | May 10, 1949 |
| 2,527,794 | Caesar | Oct. 31, 1950 |
| 2,532,515 | Pines | Dec. 5, 1950 |
| 2,624,742 | Linn | Jan. 6, 1953 |
| 2,721,886 | Pines et al. | Oct. 25, 1955 |